(12) United States Patent
Schneider

(10) Patent No.: US 11,838,686 B2
(45) Date of Patent: Dec. 5, 2023

(54) SPAESEE VIDEO CHAT SYSTEM

(71) Applicant: Daniel Schneider, Playa Del Rey, CA (US)

(72) Inventor: Daniel Schneider, Playa Del Rey, CA (US)

( * ) Notice: Subject to any disclaimer, the term of this patent is extended or adjusted under 35 U.S.C. 154(b) by 0 days.

(21) Appl. No.: 17/378,748

(22) Filed: Jul. 18, 2021

(65) Prior Publication Data

US 2022/0021845 A1 Jan. 20, 2022

Related U.S. Application Data

(60) Provisional application No. 63/053,672, filed on Jul. 19, 2020.

(51) Int. Cl.
*G06F 15/16* (2006.01)
*H04N 7/15* (2006.01)
(Continued)

(52) U.S. Cl.
CPC ......... *H04N 7/152* (2013.01); *G06F 3/04847* (2013.01); *H04M 3/568* (2013.01); *H04N 7/157* (2013.01)

(58) Field of Classification Search
USPC ....................................................... 709/204
See application file for complete search history.

(56) References Cited

U.S. PATENT DOCUMENTS 9,262,044 B2   2/2016 Gomersall
9,292,164 B2 * 3/2016 Goldman ............... G06Q 30/02
(Continued)

*Primary Examiner* — Atta Khan
(74) *Attorney, Agent, or Firm* — OMNIVAULT LLC; Robert Denis

(57) ABSTRACT

A system and method for providing remote video communications, and more specifically, a system and method for providing multi-point-of-view video chatting for a group of participants is disclosed. The client device having a microphone, a video capture device having speakers, a display device, a memory having instructions stored thereon, and a processor configured to execute the instructions on the memory to cause the electronic client device to implement the method. The method receives other user location and field of view data for other users within the multi-point-of-view video chatting environment, determines a current location and field of view of a current user the client device within the multi-point-of-view video chatting environment, receives current user streaming video and audio data from the microphone and video capture device of a current user of the client device, transmits the current location and field of view of a current user and the streaming video and audio data from the current user to the network server, receives current location and field of view of each of other users and the streaming video and audio data from each of other user from the network server, generates a visual map of the multi-point-of-view video chatting environment containing an avatar and a puck for the current user and each of the other users, generates a current user audio stream corresponding to a combination of all of the streaming audio data from the other users, and displays the visual map to a the current user and play the combination of all of the streaming audio data from the other users on the display device. The puck associated with each user is rendered at a position within the visual map and an orientation associated with the field of view associated with the corresponding user.

18 Claims, 9 Drawing Sheets

(51) Int. Cl.
G06F 3/04847 (2022.01)
H04M 3/56 (2006.01)

(56) References Cited

U.S. PATENT DOCUMENTS

| | | |
|---|---|---|
| 9,305,319 B2 | 4/2016 | Maor |
| 10,313,403 B2 | 6/2019 | Ciofalo |
| 10,524,010 B2 | 12/2019 | Cornell |
| 2008/0195956 A1 | 8/2008 | Baron |
| 2011/0225498 A1 | 9/2011 | Goldman |
| 2013/0031475 A1 | 1/2013 | Maor |
| 2014/0040783 A1* | 2/2014 | Goldman ............ G06F 3/04815 715/757 |
| 2015/0156228 A1 | 6/2015 | Langston |

* cited by examiner

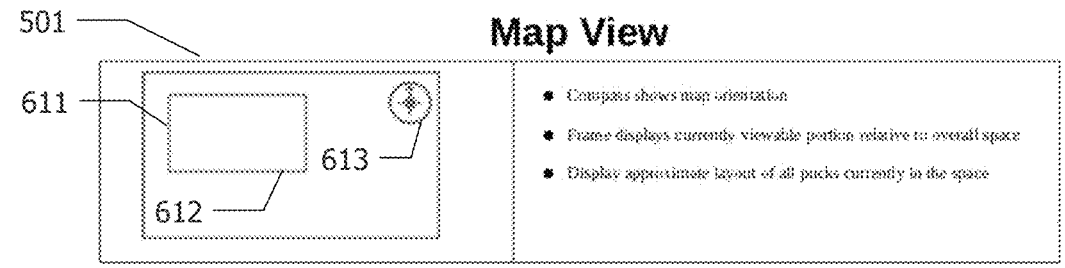
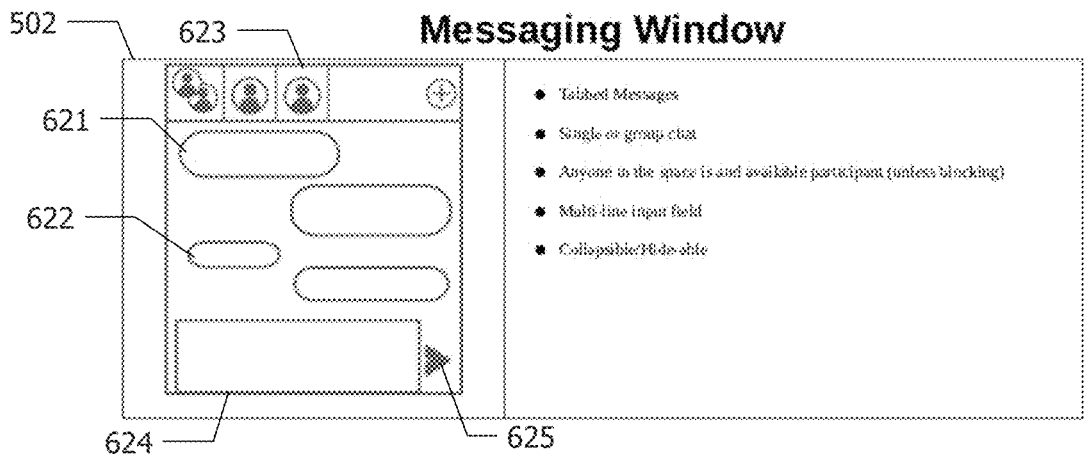
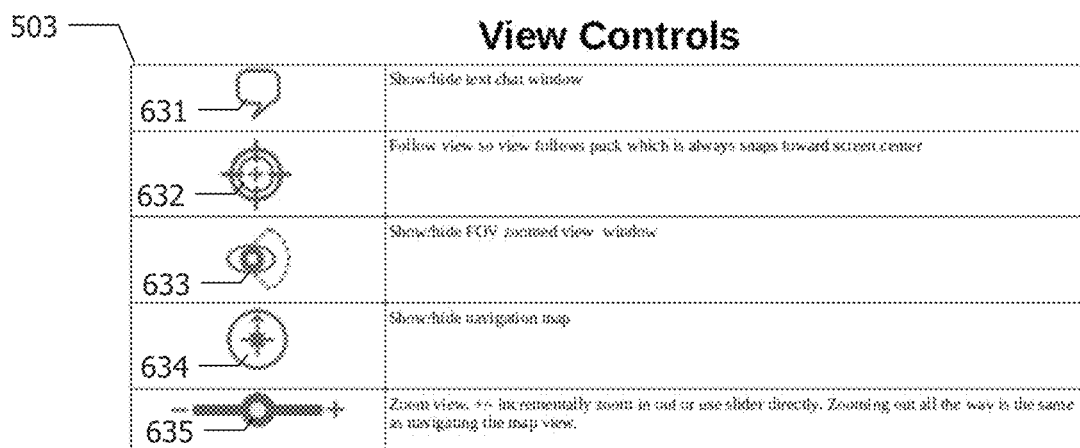
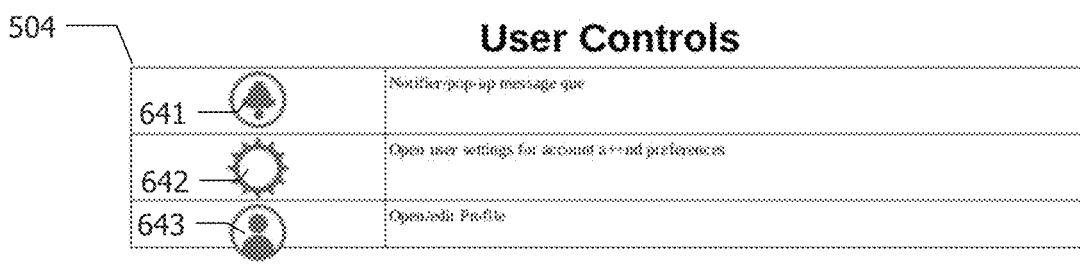
FIG. 6

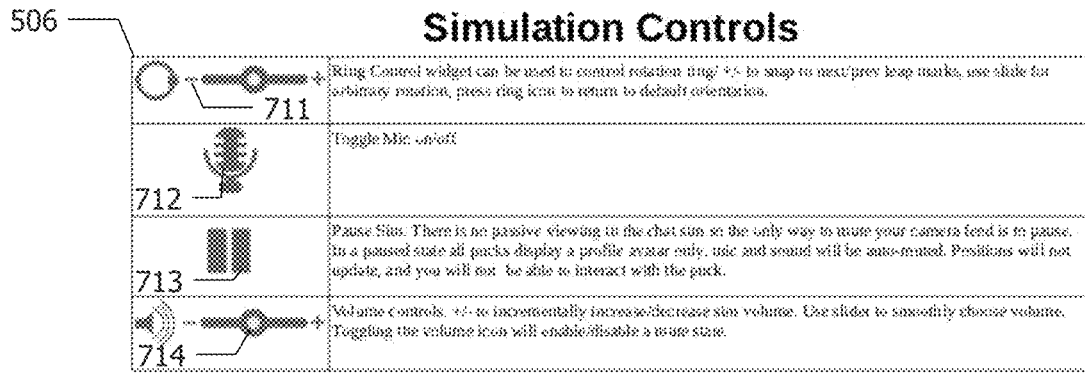
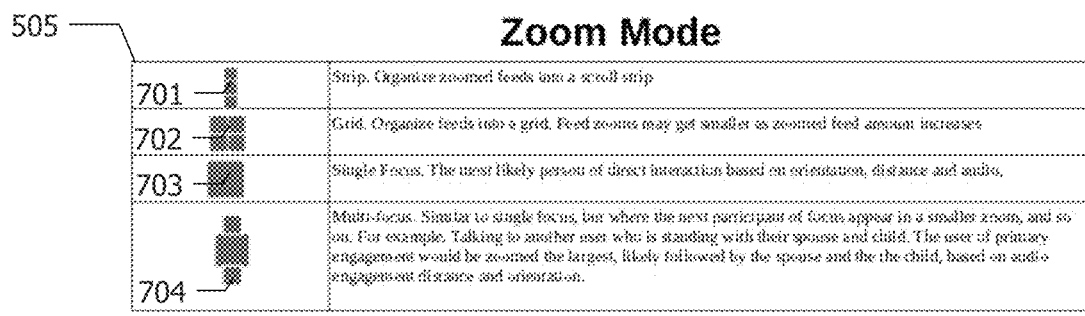
FIG. 7
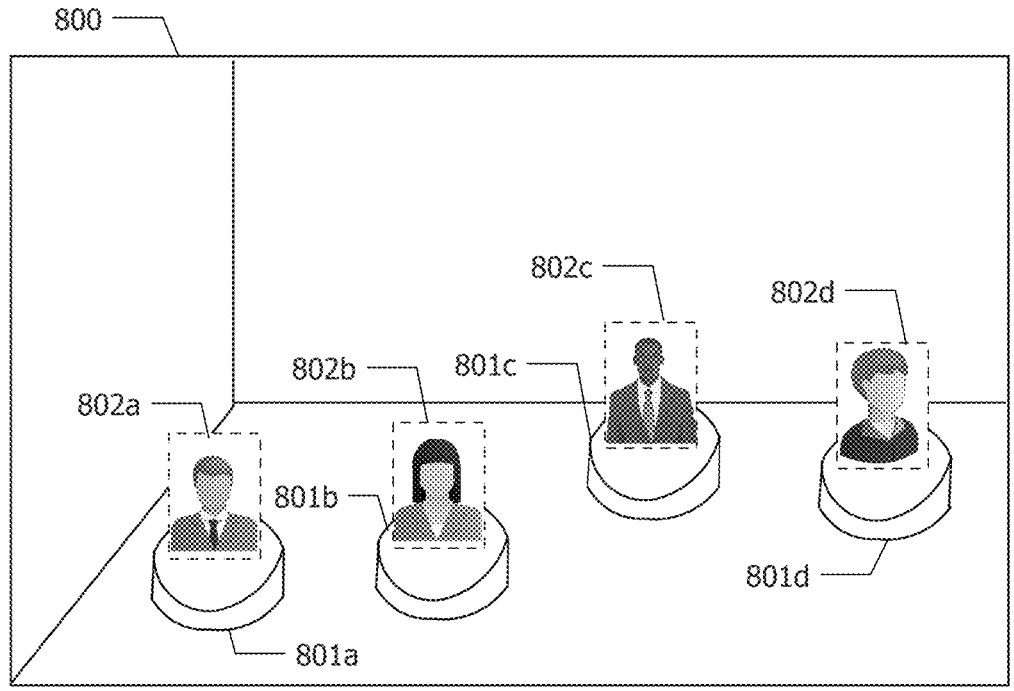
FIG. 8a

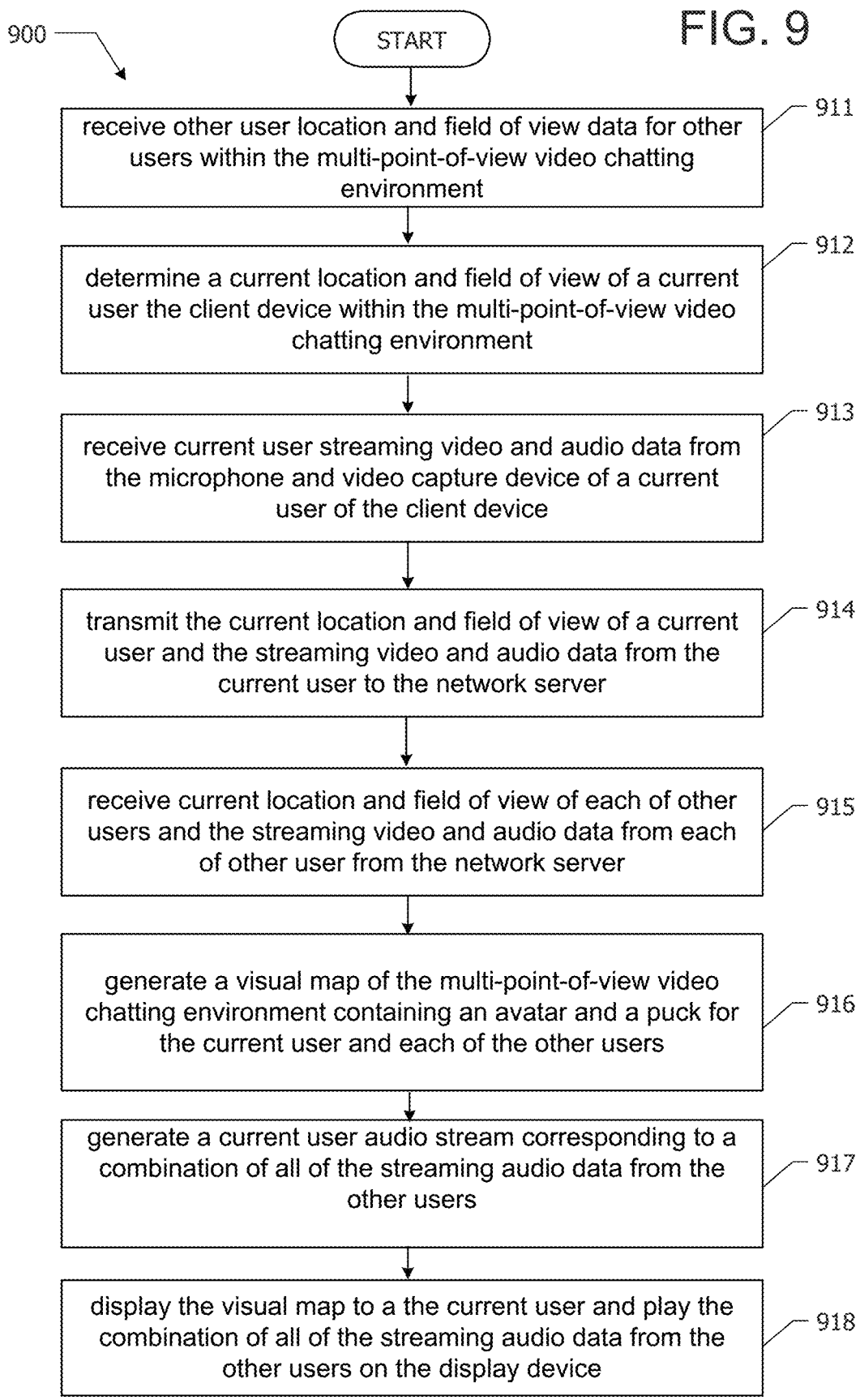

SPAESEE VIDEO CHAT SYSTEM

CROSS-REFERENCE TO RELATED APPLICATION

This application claims priority to U.S. Patent Application No. 63/053,672, titled "SpaeSee Video Chat System," and filed on Jul. 19, 2020. The entire application is incorporated herein by reference in its entirety.

TECHNICAL FIELD

This application relates in general to a system and method for providing remote video communications, and more specifically, to a system and method for providing multi-point-of-view video chatting for a group of participants.

BACKGROUND

The current multi-user video chat format encourages non-participation or majority passive participation with only engagement of the group as one person at a time addressing the many participants; only one person can speak at a time or they compete at the same volume for all other participants listening. This is counter to natural free-form social engagement. For example, in a group of people standing in a social situation i.e. a party, there will likely be a main thread of free-form discussion. Some participants near each other break into relatively lower volume, when viewed from the perspective of others not so near, and engage in related side conversion. However, there is no notion of privacy, although it may fork off to a private conversation, take over the larger conversation thread—perhaps other participants hear it and have a greater interest to participate—or merge conversation topics back to the main thread, This is afforded largely by spatial arrangement of participants and the resulting spatial audio cues.

Therefore, a need exists for a system for providing multi-point-of-view video chatting for a group of participants. The SpaeSee multi-point-of-view video chatting system solves deficiencies in the current group video chat paradigm which was designed largely for business meetings and panel or other moderated situations where there is an individual(s) who leads the meeting as a host or moderator with somewhat elevated privileges over other members. This forces a round-the-table, alternating format where only a single person at a time may efficiently address the entire group essentially broadcasting at equal volume to all participants unidirectionally.

The SpaeSee multi-point-of-view video chatting system seeks to solve these issues by utilizing spatial audio in relation to 2d video feed arrangement in 2d/3d space. Therefore, the SpaeSee multi-point-of-view video chatting system is able to segment social engagement by allowing active participants to 'turn-and-face' another user represented by a 2d video feed or image.

SUMMARY

In accordance with the present invention, the above and other problems are solved by providing system and method for multi-point-of-view video chatting for a group of participants according to the principles and example embodiments disclosed herein.

In one embodiment, the present invention is system for providing multi-point-of-view video chatting for a group of participants. The client device having a microphone, a video capture device having speakers, a display device, a memory having instructions stored thereon, and a processor configured to execute the instructions on the memory to cause the electronic client device to receive other user location and field of view data for other users within the multi-point-of-view video chatting environment, determine a current location and field of view of a current user the client device within the multi-point-of-view video chatting environment, receive current user streaming video and audio data from the microphone and video capture device of a current user of the client device, transmit the current location and field of view of a current user and the streaming video and audio data from the current user to the network server, receive current location and field of view of each of other users and the streaming video and audio data from each of other user from the network server, generate a visual map of the multi-point-of-view video chatting environment containing an avatar and a puck for the current user and each of the other users, generate a current user audio stream corresponding to a combination of all of the streaming audio data from the other users, and display the visual map to a the current user and play the combination of all of the streaming audio data from the other users on the display device. The puck associated with each user is rendered at a position within the visual map and an orientation associated with the field of view associated with the corresponding user.

In another aspect of the present invention, the avatar for each of the other users corresponds to an image of the corresponding user.

In another aspect of the present invention, the avatar for each of the other users corresponds to streaming video data received from each of the other users.

In another aspect of the present invention, the combination of all of the streaming audio data from the other users utilizes a distance of the current user location to each of the other users locations and an orientation of the field of view for each of the other users to the current user when combining the streaming audio data.

In another aspect of the present invention, the distance of the current user to each of the other users includes volume of each of the respective streaming audio data based upon a relative difference in the distances of each of the other users to the current user.

In another aspect of the present invention, the volume of each of the streaming audio data is reduced when an obstacle is between the current user and each of the other users providing s source of the respective streaming audio data when combined with each of the other users streaming audio data.

In another aspect of the present invention, the client device receives a move input command to move the current location of the current user within the visual map of the multi-point-of-view video chatting environment.

In another aspect of the present invention, the client device further receives a rotate input command to alter the field of view of the current user within the visual map of the multi-point-of-view video chatting environment.

In another embodiment, the present invention is a method for providing multi-point-of-view video chatting for a group of participants. The method receives other user location and field of view data for other users within the multi-point-of-view video chatting environment, determines a current location and field of view of a current user the client device within the multi-point-of-view video chatting environment, receives current user streaming video and audio data from the microphone and video capture device of a current user of the client device, transmits the current location and field of view of a current user and the streaming video and audio data from the current user to the network server, receives current location and field of view of each of other users and the streaming video and audio data from each of other user from the network server, generates a visual map of the multi-point-of-view video chatting environment containing an avatar and a puck for the current user and each of the other users, generates a current user audio stream corresponding to a combination of all of the streaming audio data from the other users, and displays the visual map to a the current user and play the combination of all of the streaming audio data from the other users on the display device. The puck associated with each user is rendered at a position within the visual map and an orientation associated with the field of view associated with the corresponding user.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only, and is not intended as a definition of the limits of the present invention.

BRIEF DESCRIPTION OF THE DRAWINGS

Referring now to the drawings in which like reference numbers represent corresponding parts throughout:

FIG. 6 illustrates an example embodiment of a set of video chat session graphical user interface controls and corresponding elements according to the present invention.

FIG. 7 illustrates an example embodiment of additional video chat session graphical user interface controls and corresponding elements according to the present invention.

FIGS. 8a-c illustrate various views into a virtual space with other users according to the present invention.

FIG. 9 illustrates a flowchart corresponding to a method performed by software components of a system provides multi-point-of-view video chatting for a group of participants according to the present invention.

DETAILED DESCRIPTION

Figure 1:
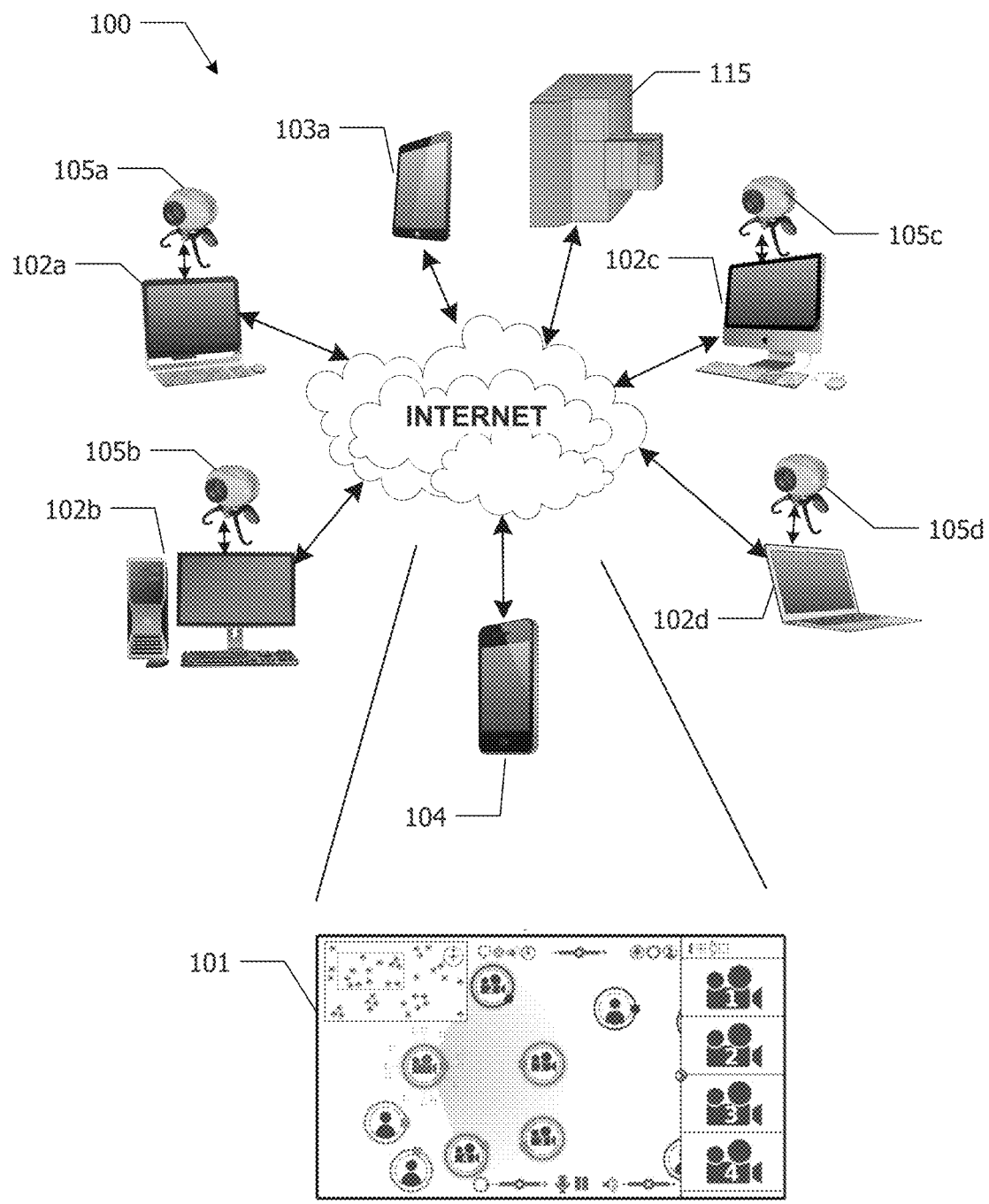
FIG. 1 illustrates an example embodiment of a system and method that provides multi-point-of-view video chatting for a group of participants according to the present invention.

This application relates in general to a system and method for providing remote video communications, and more specifically, to a system and method for multi-point-of-view video chatting for a group of participants according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly," consistent with the discussion above regarding ranges and numerical data.

The term "mobile application" refers to an application executing on a mobile device such as a smartphone, tablet, and/or web browser on any computing device.

The terms "customer," "client," and "user" refer to an entity, e.g. a human, using the SpaeSee multi-point-of-view video chatting system including any software or smart device application(s) associated with the invention. The term user herein refers to one or more users.

The term "connection" refers to connecting any component as defined below by any means, including but not limited to, a wired connection(s) using any type of wire or cable including but not limited to, coaxial cable(s), fiberoptic cable(s), or ethernet cable(s) or wireless connection(s) using any type of frequency/frequencies or radio wave(s). Some examples are included below in this application.

The term "invention" or "present invention" refers to the invention being applied for via the patent application with the title "SpaeSee Video Chat System." Invention may be used interchangeably with SpaeSee system.

In general, the present disclosure relates to a system and method for providing multi-point-of-view video chatting. To better understand the present invention, FIG. 1 illustrates an example embodiment of a system that provides multi-point-of-view video chatting for a group of participants according to the present invention. A plurality of users 102a-d, 103a, 104, use computing devices to present an individual view to each user as if all of the users are co-located within a single geographic space. These users communicate with each other over the Internet 100 under the control of a central server 115.

To deal with potentially open-ended environments and/or large social situations, a system that defines who a given user is socially engaged with is needed. This "neighborhood" of social engagement is determined by a combination of: "earshot" or a sphere of influence of audio from the feeds of other users, field of view (FOV) with adjustable clipping distance as determined by a combination of preferences, client hardware, and bandwidth to a social engagement server.

A user representation outside the neighborhood's earshot is not considered in spatial audio; likewise, other users outside the field of view do not display video but, instead, a static avatar. This further presents itself as an extension of typical social simulation. For example, consider the real world situation of the party. At any one point in time, there may be several other party goers in a particular user's FOV that are socially engaged. The user may not see a friend, Sally, who is walking up behind him/her to say hello, but the spatial audio provides a cue which causes the user to turn around and now socially engaged with Sally. Sally has her own FOV and may be able to see the user throughout the entire exchange.

The user may still hear the spatial audio cues of the group as a whole behind him/her. Sally can hear and see the user and the group behind them. The user may turn around and introduce Sally to the group. The user is now socially engaged through audio and video with those users occupying FOV, which now additionally includes Sally. Each of the users of the system 100 possesses his/her own FOV and spatial audio neighborhood while these users interact with each other.

Figure 2:
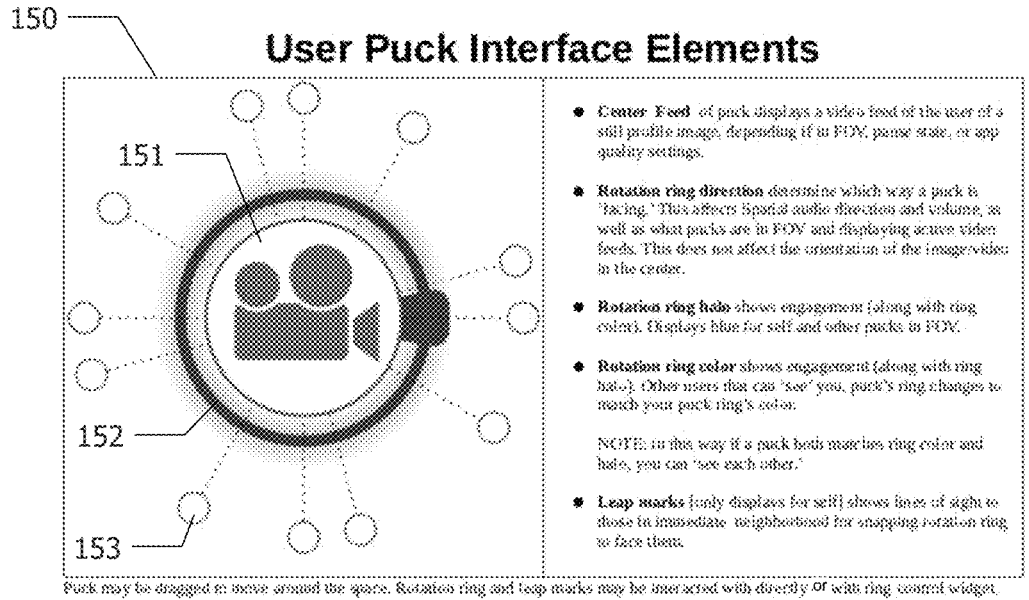
FIG. 2 illustrates an example embodiment of a user puck interface and corresponding elements according to the present invention.

FIG. 2 illustrates an example embodiment of a user puck interface and corresponding elements according to the present invention. The SpaeSee multi-point-of-view video chatting system seeks to simulate this type of social interaction of fracturing and merging conversations in a social setting through audio cues. Interaction between users and the system utilizes a novel metaphor called a "puck" 150 that represents the user and is inline, multi-functional as both a video stream as well as a way to manipulate relative position and orientation to other users comprising a neighborhood for spatial audio as well as what videos are playing on other pucks. The puck 150 also displays visual feedback via the outer ring color 152 and position 151 noting both individual orientation and whose FOV the user occupies. A matching halo 154 highlights other pucks with in FOV. Leap marks 153 around the perimeter of a user's puck 150 allow the user to instantly rotate line of site for optimizing spatial audio with another user's puck in the neighborhood.

Figure 3:
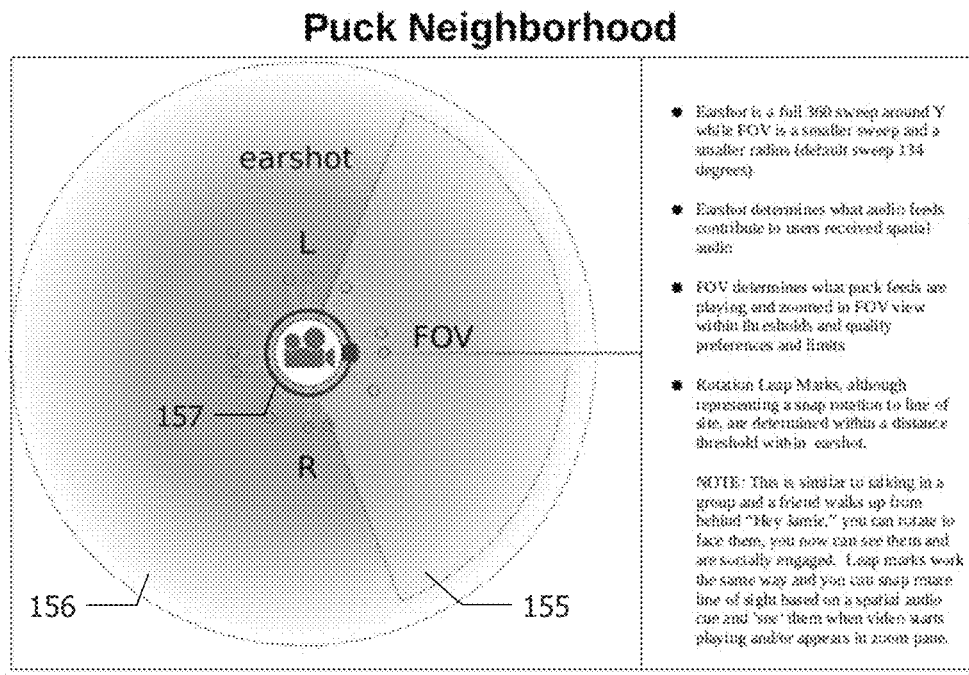
FIG. 3 illustrates an example embodiment of a user's "puck" neighborhood and corresponding elements according to the present invention.

FIG. 3 illustrates an example embodiment of a user's puck neighborhood and corresponding elements according to the present invention. An individual user's (FOV) 155 and earshot region 156 are centered around the user's puck 150. The FOV 155 extends forward from the puck 150 into the simulated space of the chat and is pointed in a direction of view. This FOV 155 corresponds to an area a user would see standing in a room while looking in one direction where the FOV would include all of the visible space within the user's peripheral and central vision.

Similarly, the earshot region 156 represents an area centered around the user's puck 150 in which all of the auditory sounds generated in the earshot region 156 may be heard. Any audio signal generated by the user will be included in the audio streams heard by other users who the user is also within their respective earshot regions 156. Similarly, the audio signals generated by these other users will be included in the user's audio stream. Each user's audio stream is a unique combination of sources for that user and would be a combination of all of the audio sources within the earshot region of the particular user. In one embodiment, these signals may be combined to be a composite signal from all of the sources. In other embodiments, the signals may be combined using the distance and relative rotation/orientation between the source and the user to factor into the amplitude of each signal relative to other sources when these signals are combined. In yet other embodiments, the audio stream for a user may comprise a series of audio streams to be played through different speakers, such as a stereo signal, that may attempt to balance the contribution of a source into the respective stereo channels to provide a directional indication of the source of the signal to the user.

Looking again at a party but in terms of the pucks 150 and spatial audio, the SpaeSee system 100 can more effectively simulate natural social interaction. A group of pucks 150 face each other in a circle as people talk to each user, now represented as a puck 157, on his/her view of the space. A user may rotate the FOV of their puck based on spatial cues, to Sally "to see" her by activating her particular video stream. Having a user leave a particular conversation in this manner is less jarring in comparison to someone muting a camera or switching to a direct feed for a side interaction. Sally is only predominately heard by a user as she approaches, however she sees in her active video streams the user and those across Sally's FOV, just as those whose pucks Sally is in can see her [stream play]. They also hear the audio cue, with varying amplitude based on position and direction relative to Sally, and still see the particular user as he or she turns around to acknowledge Sally. Should the user move further away and closer to Sally, he/she may not be able to hear the surrounding users as much among other more prevalent audio sources in his/her respective earshot. In this way, the user's sudden departure as well as return is explained by the auditory and visual cues as a result of spatial relative positions and orientations to neighborhood pucks and resulting spatial audio. This result more closely simulates a continuous flow of casual, free-form social conversation as it would naturally happen at a party.

The SpaeSee system 100 operates by repeatedly sampling locations of the pucks, FOV, and nearby objects to refresh the respective views seen by each user of the simulation. The SpaeSee system 100, as such, attempts to keep transmission of higher frequency sampling restricted to locations where these restrictions are most noticeable, which is typically closer to each user within the simulation space. This operating principle reduces update frequency and amount of data sent to the end user computers 102a-e, thus allowing the server(s) 115 to keep track of the larger simulation at the highest rate. Displayed screen-space for a given user is contained within the inner most high frequency span preserving smooth movement and spatial audio. This process limits the amount of users whose locations need to be sampled at a maximum rate, by resampling from the next outer ring—a larger group of a lower sample rate. This optimization has the greatest effect when the user is not significantly translating current position from the highest sample rate span, for example when the users are 'engaged' with other user(s). Some design/math underlying this optimization include known postulates and assumptions:

There a max velocity the pucks will travel, with this we know how far it travel across a radius and make the radial section wide enough for it to not be crossed before refresh.

The further away another users is the less the distance traveled on the circumference on a radial span at current location will affect the angle to active user less. This fundamental trigonometry and is naturally understood by humans in terms of vision which also sounds imaging. Some standing 5 feet away moves 2 feet right or left has a bigger angle change relative to the viewer/listener than someone 15 feet away, the closer person more drastically affecting the perceived positional change. A threshold balancing sample rate, maximum velocity, and distance from user exists where sampling positions more often for these distance change does not result in noticeable change in position audibly.

This optimization approach is similar for updating the visual display of the map. A ratio threshold between the map size and the lager sample area exists when the moments in simulated space do not result in significant pixel movement on the navigation overview when a user position change results in a subpixel size there may be no discernible change in position in the map at all. Larger position change on outer spans approaching max velocity can be interpolated with less perceived accuracy loss at increasing distances.

Some anticipated delays may exist when a new user enters the simulation/session which would overshadow delays from the sampling cascading back to the uttermost span to include the newly entered puck. This delay would be visible only to the viewer entering and be limited to the lowest sample rate which would typically be a small amount of seconds or a small fraction of a second. This delay may dissipate once the new user has been in the simulation session for a period of time.

Figure 4:
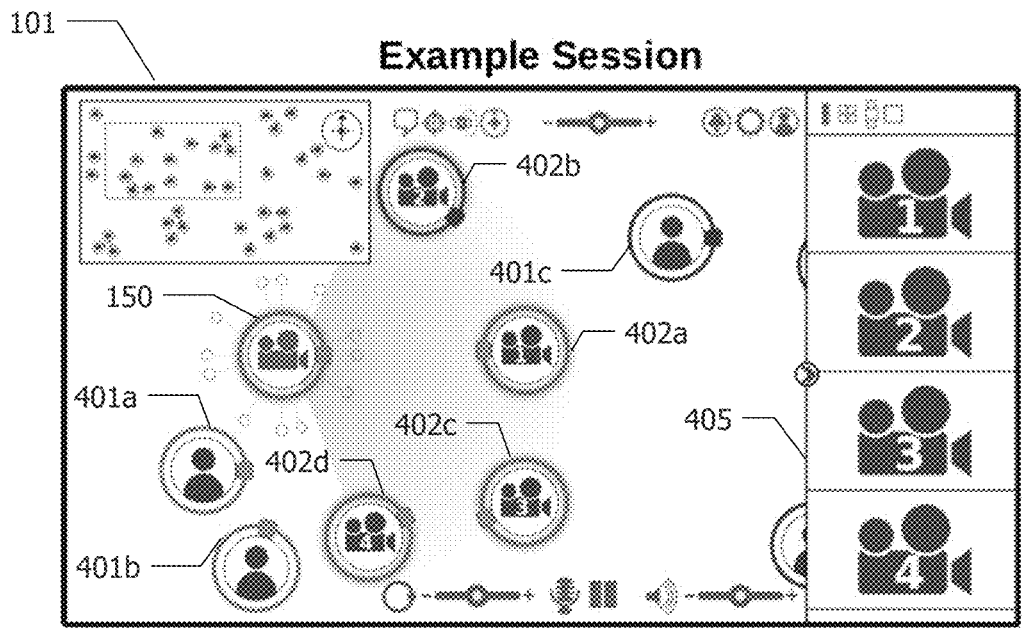
FIG. 4 illustrates an example embodiment of a video chat session and corresponding user interface screen elements according to the present invention.

FIG. 4 illustrates an example embodiment of a video chat session and corresponding user interface screen elements according to the present invention. The main session window 101 is presented to each user as a window illustrating positions of participants 401a-n, shown as multiple pucks 420a-d, a larger area window 404, and a set of zoomed FOVs 405 that correspond to views from the various pucks 402a-d. The main session window 101 presents a detailed view of the arrangement of pucks 402a-d in an area around each participant. This main session window 101 represents a portion of the larger area shown in the larger area window 404 defined by a FOV and spatial audio within audible range that is superimposed on top of the main session window 101. The area within the larger area window 404 that is displayed in the main session window 101 is identified by a marked region 406 within the larger area window 404. The example of FIG. 4 does not include a chat window as it may not always be in use. The chat window may be added and removed as needed.

The active puck 150 for the user is identified in the main session window 101 as well as the FOV shown in front of the puck 150. A set of user controls is located about the main session window 101 that allows the user to change the display option of the video chat simulation including any associated text based "chat" window of the chat activity. These controls are identified and described in detail below in reference to FIG. 5.

The SpaeSee system 100 permits user sub engagement and fractioning. The user's neighborhood allows culling of a potentially large, represented space of interaction as shown in the large area window 404. Again, taking the example of a small group of partygoers: there may be sub-engagement in the open between other group members. This is most common as examples of conversations in real space between couples, family or people arriving together. This type of sub-engagement is an open aside that may still be heard to some degree by others, but is not disrupting and socially non-offensive. These engagements would include turning to a friend and saying, "going to the bar for a beer, would you like one" or a person turning to his/her spouse and asking, "do you feel like staying longer?" Again, these interactions differ from direct video because, as in the real world, the exchange is not private but, also not emphasized, so as to not break social activity. As these exchanges are not entirely private, a user might also steer conversation when the conversation has otherwise fractioned.

Looking at an example, a subgroup has started talking about sports. A particular user knows a roommate also does not follow sports and is equally secluded, so the user may turn to him/her knowing he/she just saw a new movie and subtly ask about it. The person next to the roommate hears the comment as well and says "oh yeah I saw that, it was great" perhaps causing the three users to face each other fractioning the group or perhaps those involved in sports talk realize the lack of interest and join the conversation about the movie. This type of aside sub-engagement and fractioning allows natural rapid evolution of subject matter into casual group "small-talk" in a way that current non-spatial video chat paradigms do not. Just as in the real world, this is afforded by location of the user in the main session window 101, the direction of line of sight via FOV from a puck 150, and spatial audio generated for the neighborhood. The user is able to face the roommate and talk low directly to him/her in a non-private manner, but also in a quieter way so as to not interrupt or compete with the audio of the sports conversation.

The SpaeSee system 100 also provides moving audio while users are mingling. The puck interface 150 and resulting user's neighborhood allows a simulated way to roam a crowd or social gathering that is not afforded by the current video chat paradigm of a grid layout where position is static and does not affect audio. Moving the puck 150 and the direction-facing allows video feed to become active and inactive as a user passes through the moving FOV. Additionally, other participants may come in and out of focus in the spatial audio mix allowing a way to cull a changing neighborhood similar to walking about the space. This arrangement gives users access to a large number of other users to interact with while having a known range of audio video streams to synchronize, and consider, in the spatial audio mix.

Those participants who are not in the neighborhood only need a static avatar image for the puck 150 and a location/ orientation. Those participants who are within earshot, but not within a visual FOV, do not need their video streams transmitted, only their location orientation and audio stream. Only those participants in the neighborhood in both the active FOV and earshot require the greatest bandwidth for position/orientation, audio-video streams. Much as in real space, puck 150 representing users cannot occupy overlapping space, thus in combination with neighborhood configuration, this allows a predictable amount of streaming data.

The SpaeSee system 100 utilizes a 2D-dimensional interface using a web browser-based and mobile application-based interface in one embodiment. These interfaces allow interaction via a touch device or via a mouse/pointing device. Alternate 3D-dimensional virtual spaces and interfaces may also be used in other embodiments on these device with interaction via pointing devices and touch interfaces. Additionally, as Augmented Reality/Mixed Reality/Extended Reality overlays become available, these interfaces may require the system 100 to take into account additional tracking and sensor data to determine a 1st person view. A Full VR experience, which would allow navigating in the virtual 1st or 3rd person throughout the 3D layout of pucks and 2D video feeds, may be created from this 3D interface.

In a 2D 3rd person view, the presentation of the user's view may be controlled by the puck 150. In a 3D 1st person view, the user may provide control over the view via the input of game controllers and sensors. In a 3D view, the puck 150 appears on the ground plane beneath the user and floating heads-up display (HUD) as an interactive navigation device. In a 3D 3rd person view, this presentation of a user's view would be shown with the puck 150 on the ground plane and optionally self-video feed floating above perpendicular to the user's eye-vector.

Templates assigned for special sessions in the interface provide optional spatial restrictions to simulate more traditional scenarios. These templates may be useful in the following examples: a virtual theater seating affording the social aspect of a traditional event experience; a virtual holiday meal where the template could give users a seating position around a table that may be especially important for certain religious holidays, i.e. Passover, where the seating position has relevancy to relaying the oral tradition; and a church session with templated pews to restrict users facing toward the leader and allow interacting and addressing members in a traditional spatial manner.

Social scenarios, as an example embodiment is shown in FIG. 8, where such as system as outlined would provide more natural interaction and simulation enhancement include but are not limited to: brainstorming sessions, non-moderated discussions, concerts and virtual entertainments venues, virtual family holidays and meals, religious venues, virtual dating, bars and lounges, virtual night clubs, workshop-style class format, cooperative artistic endeavors or simulated board-like traditional games.

Figure 5:
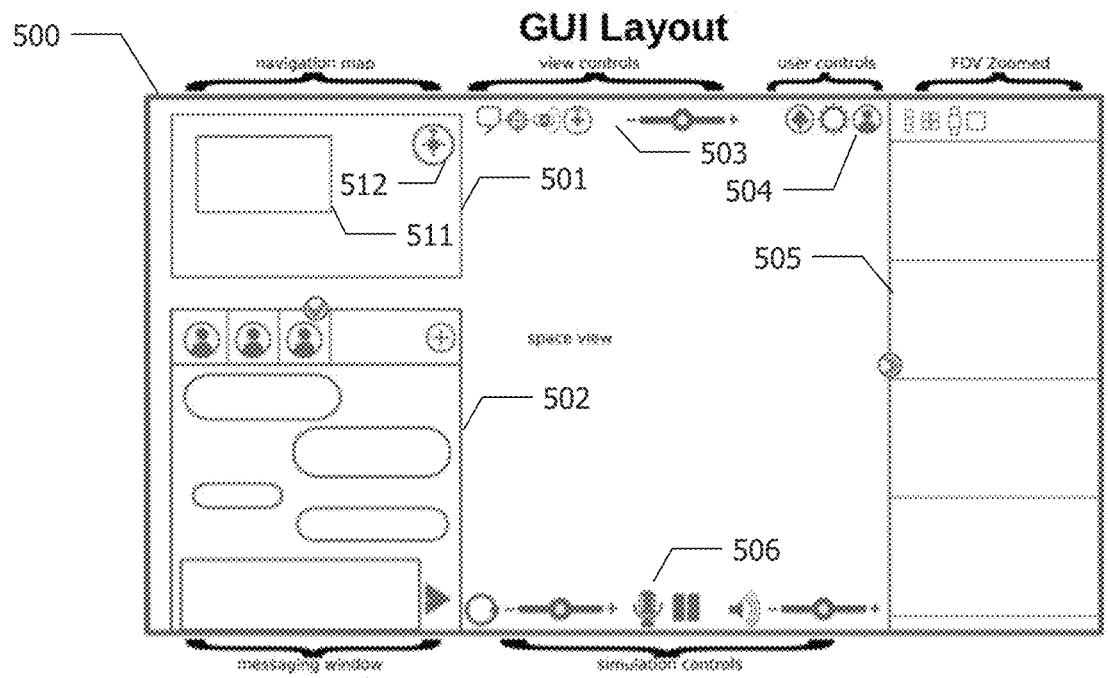
FIG. 5 illustrates an example embodiment of a video chat session graphical user interface and corresponding elements according to the present invention.

FIG. 5 illustrates an example embodiment of a video chat session graphical user interface (GUI) and corresponding elements according to the present invention. The user's GUI 500 is part of the main session window 101 and presents each user with a set of control objects to permit each user to change the location and operation of the SpaeSee system 100 and their respective position/orientation therein. A GUI layout 500 presents the main session window 101 presented to a user that contains a navigation map 501, a message window 502, a set of view controls 503, a set of user controls 504, a plurality of FOV zoomed views 505, and a set of simulation controls 506. Each of these controls and their respective components are defined below in detail in reference to FIGS. 6-7.

FIG. 6 illustrates an example embodiment of a set of video chat session graphical user interface controls and corresponding elements according to the present invention. The GUI interface 500 controls include the navigation map 501, the message window 502, the set of view controls 503, and the set of user controls 504. The navigation map 501 controls the contents of the main session window 101 of the SpaeSee system 100 as seen by a particular user. The navigation map 501 comprises a large space window 611, a subset region window 612, and a navigation compass 613. The large space window 611 represents the entire area of the chat session for a user and is superimposed upon the main session window 101 in an upper corner. The large space window 611 contains the subset region window 612 which represents the portion of the entire area of the chat session around a user's neighborhood. The subset region 612 bounding area of what is visible in the main session window as a subset of the world included off screen bounded by all users in the space. Within both the large space window 611 and the subset region window 612, icons are included to indicate the location of various pucks 402*a-d* and participants 401*a-n*. As the participants 401*a-n* move about the entire area of the chat session, these icons are repositioned to provide a current location for each participant.

The navigation compass 613 illustrates an orientation of the entire area of the chat session with respect to a direction in which the particular user is presently oriented. As the particular user navigates the entire area of the chat session and his or her orientation relative to the entire space, the navigation compass 613 changes to provide a current spatial orientation for the user.

The message window 502 provides each participant with an ability to engage in a text message exchange with one or more other participants present within the entire area of the chat session. The message window 502 comprises a main message box 621, a plurality of text messages 622 exchanged with a particular participant or a particular group of participants, a selection control 623 for choosing which of the particular participants or the particular group of participants is currently active, and a text message input box 624. The main message window 621 shows a series of text messages 622 that have been exchanged between a particular participant or a particular group of participants. The message window 502 may support a plurality of different text message sessions as selected by the selection control 623. As a user picks one of the possible chat sessions using the selection control 623, the content of the main message window 621 changes to display the series of text messages 622 corresponding to that particular chat session. The user enters a text message to be sent to the active chat session into the text message input box 624. The user enters a return character to send the contents of the text message input box 624 to the participants in the active chat session. The user may also use a send button 625 or similar UI controls.

The set of view controls 503 permits a user to change the content of the main session window 101 presented on his or her display device. The set of view controls 503 comprise a toggle chat window 631, a follow view 632, a toggle FOV zoomed view 633, a toggle navigation map 624, and zoom view 625. The toggle chat window 631 alternately shows and finds the chat window 502 from the user's main session window 101. The removal of the chat window 502 permits the user to view objects within the large area of the chat session that may be covered from view when the message window 502 is visible.

The follow view 632 instructs the SpaeSee system 100 to present to the user a view that follows the movement of the puck 150 and always snaps toward the screen center.

The toggle FOV zoomed view 633 alternately shows and finds the FOV zoomed view 505 from the user's main session window 101. The removal of the FOV zoomed view 505 permits the user to view objects within the large area of the chat session that may be covered from view when the FOV zoomed view 505 is visible.

The toggle navigation map 624 alternately shows and finds the navigation map 501 from the user's main session window 101. The removal of the navigation map 501 permits the user to view objects within the large area of the chat session that may be covered from view when the navigation map 501 is visible.

The zoom view 625 incrementally zooms a user's view in the main session window 101 inward and outward as represented by the content of the neighborhood region window 612. Zooming out with the zoom view 625 as far as possible permits the user to navigate the large area of the chat session within the entire large space window 611. A pixel threshold may be needed in various cases to limit how far out a user may zoo. For example, when a user zooms out, the pucks become so small that each puck no longer has significant pixels or resolution to indicate direction at all. A minimum pixel threshold may also be needed for video. This minimum threshold is formulated from the world size, zoom value, device resolution and user preferences/settings.

This control is not a button to toggle off the queue notification but rather to view previous queue items. A pop up a message may be any kind of notification and not necessarily a message from a user. For example a user may receive a reminder "you have a meeting starting in another room in 10 mins" or "please update password." The button will pop open a floating queues which can be scrolled through if a message was missed or need to be referred to by the user. A common "mute notifications" function exists as well likely through a control element such as a menu or a tap and hold option on the notifier. This mute notification control is not its primary function. That would simply mute the popups but still ad items in the que for viewing later.

The set of user controls 504 enables the user to set and change user-related settings to the SpaeSee system 100. The set of user controls 504 comprise a notifier pop-up message queue 641, an open user settings 642, and an open user profile 643. The notifier pop-up message queue 641 instructs the SpaeSee system 100 whether to provide notification to the user of an incoming message in the form of a pop-up notification. This user control 641 permits the user to view previous queue items. The open user settings 642 causes the SpaeSee system to open a user settings window that permits the user to set or modify all of the user settings available for user control. The open user profile 643 causes the SpaeSee system to open a user profile window that permits the user to set or modify all of the user profile data that is made available for other participants to see.

Additionally, the pop up notification also may be any kind of notification and not just necessarily a message from a user shown here as an example. For example, a reminder notification "you have a meeting starting in another room in 10 mins" or "please update password" notification may be presented to a user. A button may pop open a floating ques which may be scrolled through if a message was missed or need to be referenced. The SpaeSee system 100 includes a common "mute notifications" function that may simply mute the pop ups from being presented to a user while still adding items in the queue for viewing later. The mute notification control may be implemented through a menu or a tap and hold option on the notifier. Until a message is read, the messages exist queued in a list to be read. The messages also are potentially kept in this queue after being read when they are not highlighted. The user may click on the messages and they are displayed as overly of messages.

FIG. 7 illustrates an example embodiment of additional video chat session graphical user interface controls and corresponding elements according to the present invention. The GUI interface 500 controls also include the plurality of FOV zoomed views 505 and the set of simulation controls 506. The plurality of FOV zoomed views 505 controls permits a user to define how a plurality of zoomed views 505 available in the main session window 101 may be presented in the FOV zoomed view control. The plurality of FOV zoomed views 505 controls comprise a strip view 701, a grid view 702, a single focus view 703, and a multi-focus view 704. Selecting one of these controls causes the plurality of FOV zoomed views 505 to be presented as a strip of views, a grid of views, a single view, and a multi-view. The multi-view presentation of the views is similar to single focus, but where the next participant of focus appears in a smaller zoom; for example, talking to another user who is standing with his/her spouse and child. The user of primary engagement would be zoomed the largest, likely followed by the spouse and the child, based on audio engagement distance and orientation.

The set of simulation controls 506 are used to permit a user to determine how the SpaeSee system 100 operates regarding the various interactions with other participants. The set of simulation controls comprises a ring control 711, a toggle mic 712, a pause sim 713, and a volume control 714. The ring control 711 may be used to control rotation ring/+/− to snap to next/previous leap marks, use the slide for arbitrary rotation, and press the ring icon to return to a default orientation.

The toggle mic 712 alternately turns on and off the user microphone that generates an audio source or inclusion in the audio feed of participants within the user's neighborhood.

When a user is paused, their respective puck display an avatar and other users will only see this avatar. The puck appears to remain motionless to other users while they continue to interact with the rest of the simulation. The SpaeSee system 100 also may include a time out function in which a user is temporally removed from the session. If a user's connection to the simulation is left on accidentally, such as when a user fell asleep, is called away suddenly, or similarly distracted for an extended period of time, the time out function removes the user avatar as if the user's had left to avoid an inactive avatar from becoming an obstacle perpetually for users still in the simulation. The time out function may be defined by a combination of a global settings pushed to users by the SpaeSee system 100 as well as a user preference setting. This time out function also may be implemented to include small loops that are intended to be similar to operating system background work loops or game idle loops. In this case, a time out period may show an animation updating how long the user has been pause or is left before disappearing from the simulation. This timer being displayed provides an indication to other useful in deciding if a user should "wait around" for someone to return.

Because the SpaeSee system 100 does not provide passive viewing in the chat simulation in a preferred embodiment, the pause sim 713 control provides the only way to mute a user's camera feed by pausing the simulation. In a paused state, all pucks display a profile avatar only. All microphone and other sound will be auto-muted. Positions of any participants are not updated, and the user is unable to interact with the puck 150. In alternate embodiments, passive viewing may be possible in which the image as sound of the user may be seen and heard but the user does not contribute to what other users may see hear, and interact.

One skilled in the art will recognize that a display of the simulation described herein as being presented on a computing device such as a laptop, tablet, or personal computer screen is used for example purposes only. The SpaeSee system 100 may also present the simulation to users using other display devices. For example, headsets/VR that are tethered to a computing device or that are wirelessly connected to provide a mobile experience, may be used to provide an output display and sensor inputs for an external device to the main computer. The SpaeSee System 100 is not intended to be limited by any particular example embodiment disclosed herein as is defined solely by the claims attached hereto.

The volume control 714 incrementally increases/decreases simulation volume. Use of the slider within the volume control 714 permits a user to smoothly choose volume. Toggling the volume icon will enable/disable a mute state.

Figure 8B:
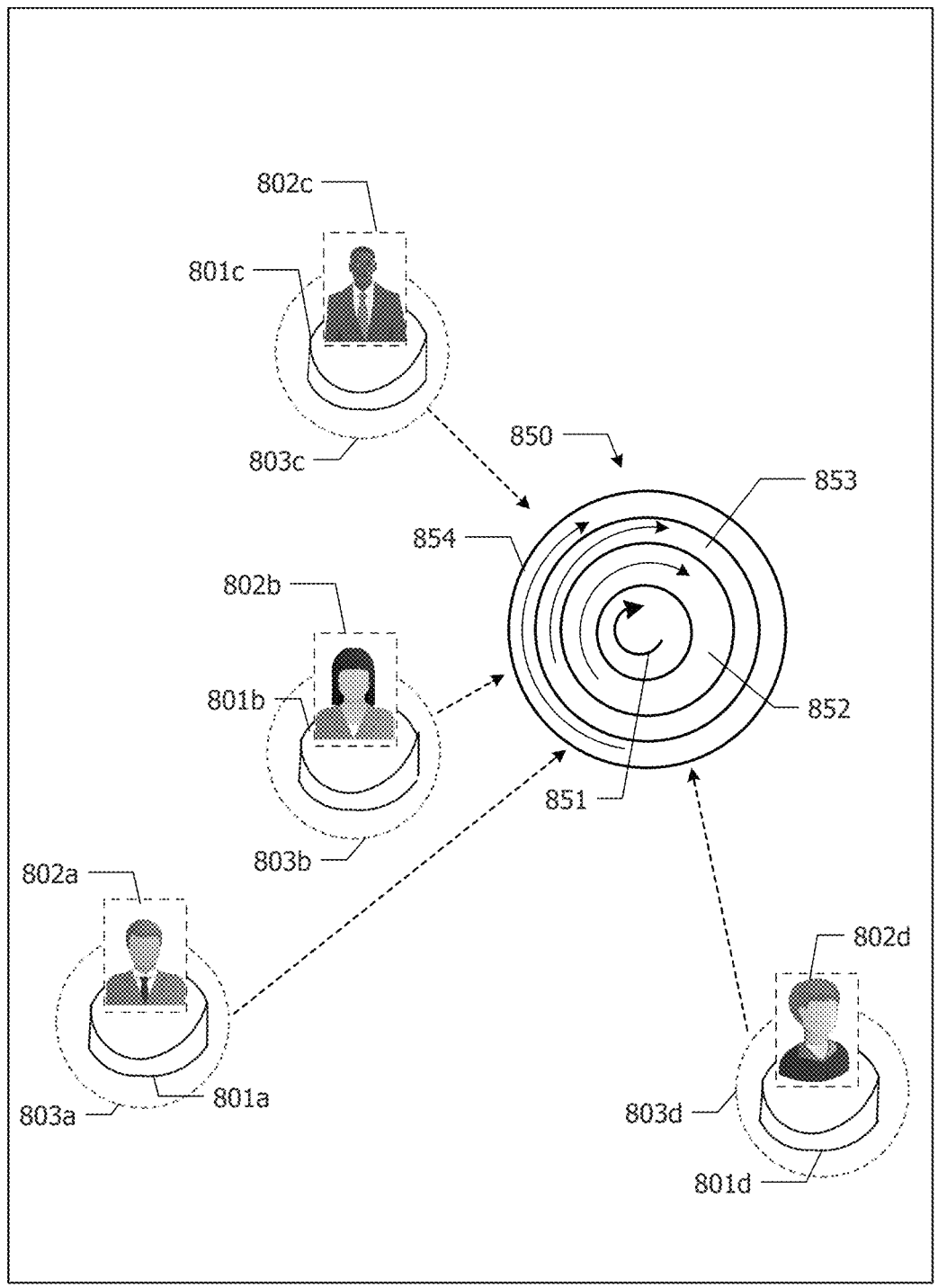
Figure 8C:
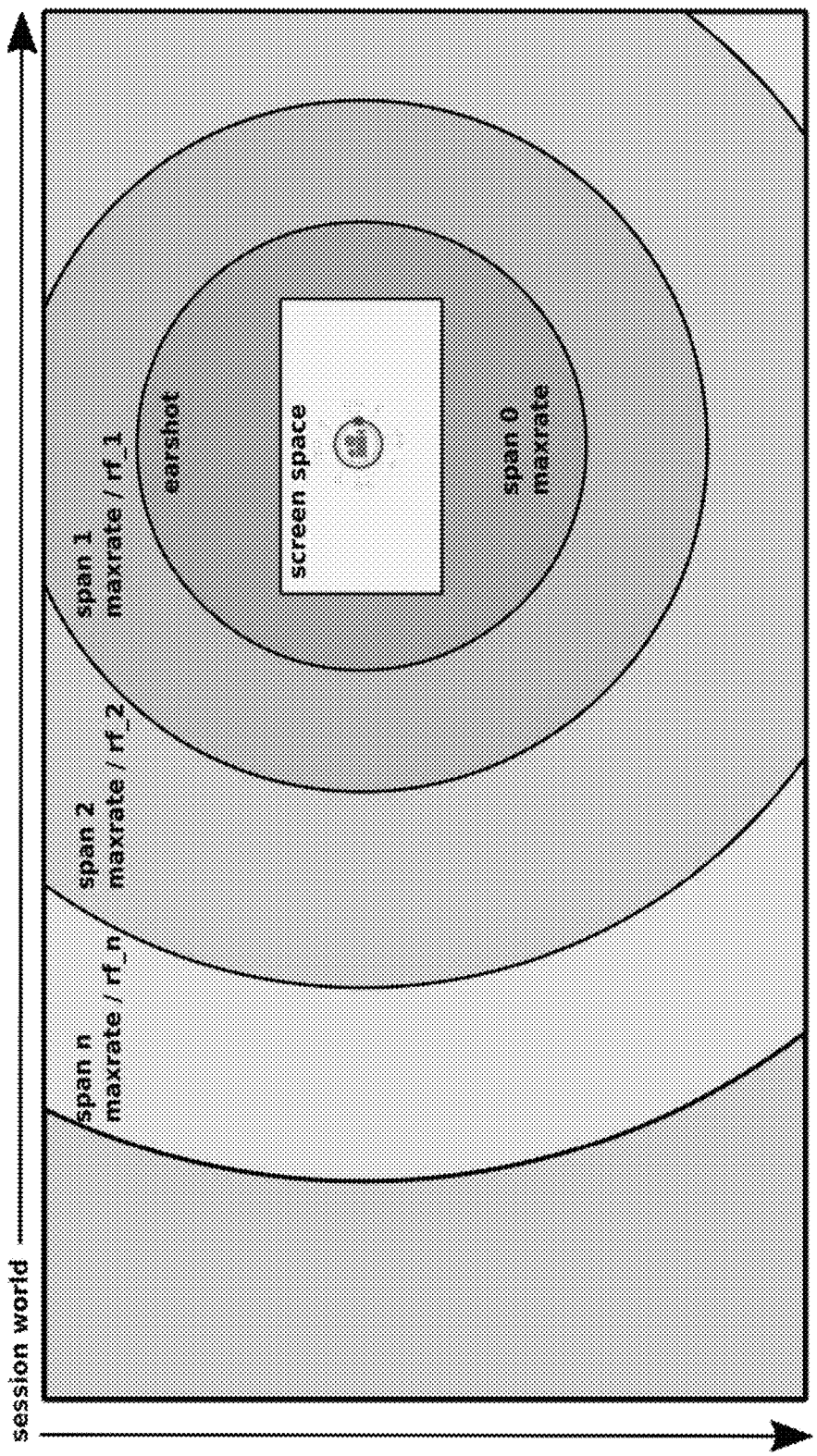

FIGS. 8a-c illustrate various views into a virtual space with other users according to the present invention. FIG. 8a illustrates a particular user's view into a virtual space with other users according to the present invention. In order to create a social scene of FIG. 8, each user uses a computing device 102a-d coupled to the internet 110. These computing devices 102a-d may include desktop and laptop computers and mobile devices such as smart phones and tablets.

Each computing device 102a-d has an input device, a microphone, one or more speakers, a video camera, and a display. The input device permits the user to interact with the scene via a puck 150 and its GUI as defined above. The microphone captures an audio stream of the user and the video camera captures a video stream of the user while he/she interacts with the system 100. These two video streams are used to create a combined audio stream for all of the users located within the user's puck neighborhood 156. The combined audio stream is played to the user on the speakers of his/her computing device 102a-d.

The combined audio stream typically includes the sound is directed directly towards the receiver. The combined audio stream also use a measure of how far away various sound influences may affect how a user hears each source of audio data. In a templated system for example, a template may be set to provide "collision" or "obstacles" between an audio source and a receiver that may be altering a sound. When two people are facing each other with a template pillar between them, the resultant combined audio streams for these particular user may have both muted resulting sound from each other in their respective combined audio streams because of a simulation of the effect of the pillar. In the case of multidimensional sound output like surround sound, similar changes in a predominant direction from which the audio is perceived may be similarly altered by objects defined within templates of the space in which the users are virtually located.

The video stream of each user is presented as a small video avatar 802a-d shown above each user's individual puck 801a-d as shown in FIG. 8a. The social scene 800 presents each user with a view of the individuals positioned within the user's individual FOV 155 within the virtual space contained is the large space window 611 of the navigation map 501. As noted above, the individual user's FOV 155 is defined by the user's puck 150 and the rotational ring direction of that particular puck 150. As a user moves around the virtual space of the navigational map 501 or as the user changes his/her orientation about his/her individual puck 150, the contents shown from the social scene 800 change to show the updated contents of the FOV 155.

In order to create the social scene 800, the audio streams from the users are combined to permit each user to hear the sound within each user's separate puck neighborhoods 156. For each the four users shown in FIG. 8 along with the user seeing this particular FOV 155, need all of their audio streams combined to create their combined audio streams played on the user's speakers. Because the contribution of each of these audio streams may be controlled by raising or lowering the amplitude of each audio stream based upon the distance and orientation of each source from the particular user, a separate combined audio stream is generated for each user. In addition, 3d rotation of a user defining the direction the user generating sound is facing is also critically required for directional audio. The resulting amplitude heard from a source may be determined for each user hearing a speaking user depending upon whether the sound is directed directly towards the receiver. This creates the directional component of sound.

At the same time, the individual FOV 155 for each user must be rendered with a separate representation of their respective FOV in the virtual space in which the pucks 801a-d of the users in the particular FOV 155 is added along with a 2D video avatar 802a-d are shown above their respective pucks 801a-d at their particular locations within the virtual space as defined on the navigation map 501.

The processing of the individual audio streams and the rendering the corresponding visual FOV 800 may be performed either on each individual's computing device 102a-d or upon a remote server 115. The choice of where each user's data is processed may depend upon the computational capacity of each user's computing device 102a-d and the available computer network bandwidth between the users' computing devices 102a-d and the server 115. In the embodiment in which the server 115 generates all of the combined audio streams and renders all of the user's FOVs 800, the audio stream from the user's microphone and the video stream from their camera are sent over the Internet 110 to the server 115. The server 115 then generates the audio and video data for each user before it is returned for presentation to the user. User's commands to move around the virtual space of the navigational map 501 and to rotate their FOV about their neighborhood pucks 801a-d are also sent to the server 115 by the users' computing devices 115. Using these commands, the server moves the current position and orientation within a spatial coordinates of the navigational map which are then used to determine which users are in each other user's puck neighborhood 156 and that user's FOV 155 that are then used when combining the various audio and video data streams for each user.

If each user's combined audio stream and visual FOV is generated on the user's computing device 102a-d in a different embodiment, the user commands to move and change a user's orientation are still sent to the server 115 so that the server 115 may maintain the current position and orientation within a spatial coordinates of the navigational map which are then used to determine which users are in each other user's puck neighborhood 156 and that user's FOV 155 as above in the alternate embodiment. Once each user's neighborhood 156 and visual FOV 155 is determined, the identity of users in each other's neighborhood and visual FOV is sent to each user computing device 102a-d in order for each user computing device to send its audio and video streams to the other user's computing device 102a-d that needs to receive a video stream. The distributing of the generation of the audio and video data for each user's view into the virtual space requires all of the computing devices 102a-d to possess an IP address for each of the other users computing devices 102a-d and each user's location within the puck neighborhood 255 and visual FOV 155 as it changes over time. The server 115 may send the various user computing devices 102a-d an instruction to enable sending an audio stream to a particular user when that user enters another user's puck neighborhood 156. The server 115 also may send the various user computing devices 102a-d an instruction to disable sending an audio stream when the same user leaves another user's puck neighborhood 156. Similar, the server 115 may send the various user computing devices 102a-d an instruction to enable sending a video stream to a particular user when that user enters another user's FOV 155. The server 115 also may send the various user computing devices 102a-d an instruction to disable sending a video stream when the same user leaves another user's FOV 155.

In both embodiments, each user's computing device 102a-d presented their user with that user's combined audio stream and visual FOV rendered video stream using the user's computing device's 102a-d speakers and display. Each user will be provided a simulated view into their interaction with other user's within the virtual space of the navigational map. The movement and orientation of each user changes the received and consumed content as the user moves about the virtual space. A live video stream of each user contained within the user's avatar 802a-d permits each user to interact with the other users in a manner similar to actually being near each other in a non-virtual space.

FIG. 8b illustrates a spatial view into a virtual space with cached location data and search patterns according to the present invention. Within the visual FOV 800 in which users' avatars 802a-d and their corresponding pucks 801a-d are presented with a representation of each user's location, a set of concentric search areas 803a-d are imposed about each user. Each of these concentric search areas 803a-d contain a plurality of search areas 851-854 that are search when each user's computing device 102a-d are updating the location of each user puck 810a-d within the visual FOV 800. Location data and other relevant information associated with each user is maintained within a data cache (not shown) that is updated as the user moves about the visual FOV 800.

The users' computing devices 102a-d are repetitively scanning the data received from other computing devices to determine where each user within the visual FOV 800 is currently located. As noted above, the location of each user to all other users affects how video and audio data from each user is presented to other users. The users' computing devices 102a-d are repeatedly and periodically updating the location of each user in order to determine when any particular user is moving within the visual FOV 800. When a user has been determined to have moved, a current location and related data is set to the newly determined location.

The related data may include any other information usable to define a user's FOV and experience in the simulation. For example. the related data may include other session setting including size of earshot, screen space shown, FOV and neighborhood, mute state, profile/user ID so the profile may be accessed, information about resolution and bandwidth for optimizations of data transmissions give network activity, user device socket information containing network communication parameters, avatar location and image, and current previous and anticipated next location and orientation. These items are not necessarily an exhaustive list of data that may be included as related data, rather they are provided as examples of data that may be useful if maintained herein.

The current position of each user is maintained within a cache that is accessible by other software components when generating the visual FOV 800 data and all video and audio data provided to each user.

In order to minimize the time to update the locations of each user's puck 801a-d, the set of concentric search areas 803a-d are searched around a current location of each user puck 801a-b to minimize the number of locations to be searched each time the current location data is updated. A user is not expected to move a significant distance within the visual FOV 800 between each time their respective current locations are updated. As such, the location around a current position is search, starting with the innermost concentric circle 851 and proceeding in order of increasing radius 852-854 until a user is located and a new current position is determined as shown in detail in FIG. 8c. The search first checks for the presence of a user in the innermost concentric circle 851; and when the new location for the user is not found therein, the next concentric circle 852 is searched for the presence of the user. After all locations within a particular concentric circle 851-854 have been checked without finding the user, the process repeats in increasingly larger concentric circles until the user is found. This search process ends when the user's location is determined, and the current location data is updated. The entire search process through the set of concentric circles 851-854 is repeated for every user puck 801a-d within the visual FOV 800. Additionally, these search takes into account the user FOV as well as location while considering which other user pucks are within earshot of the user.

FIG. 9 illustrates a flowchart corresponding to a method performed by software components of a system provides multi-point-of-view video chatting for a group of participants according to the present invention. The process 900 begins and in step 911, the remote computing device receives other user location and field of view data for other users within the multi-point-of-view video chatting environment. In step 912, the remote device determines a current location and field of view of a current user the client device within the multi-point-of-view video chatting environment; before it receives current user streaming video and audio data from the microphone and video capture device of a current user of the client device in step 913. The remote device, in step 914, transmits the current location and field of view of a current user and the streaming video and audio data from the current user to the network server, and receives, in step 915, current location and field of view of each of other users and the streaming video and audio data from each of other user from the network server.

Using the above data, the remote device generates a visual map of the multi-point-of-view video chatting environment containing an avatar and a puck for the current user and each of the other users, the puck associated with each user is rendered at a position within the visual map and an orientation associated with the field of view associated with the corresponding user in step 916. The remote device, in step 917, generates a current user audio stream corresponding to a combination of all of the streaming audio data from the other users. The process 900 displays the visual map to a the current user and play the combination of all of the streaming audio data from the other users on the display device in step 918. The entire process repeats periodically while a user in within the simulation.

Figure 10:
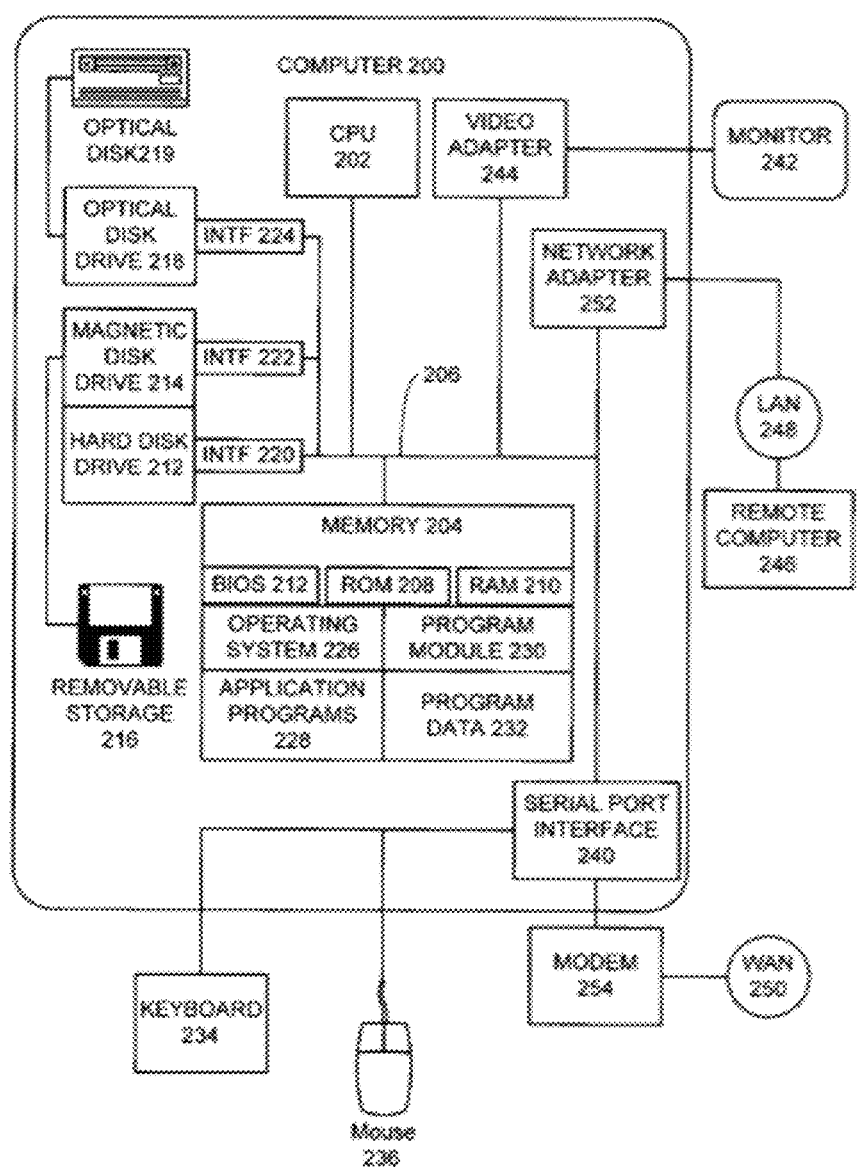
FIG. 10 illustrates a computing system of software components providing multi-point-of-view video chatting for a group of participants according to the present invention.

FIG. 10 illustrates a generalized schematic of a programmable processing system utilized as the various computing components described herein used to implement an embodiment of the present invention. The central processing unit ("CPU") 202 is coupled to the system bus 204. The CPU 202 may be a general-purpose CPU or microprocessor, graphics processing unit ("GPU"), and/or microcontroller. The present embodiments are not restricted by the architecture of the CPU 202 so long as the CPU 202, whether directly or indirectly, supports the operations as described herein. The CPU 202 may execute the various logical instructions according to the present embodiments.

The computer system 200 also may include random access memory (RAM) 208, which may be synchronous RAM (SRAM), dynamic RAM (DRAM), synchronous dynamic RAM (SDRAM), or the like. The computer system 200 may utilize RAM 208 to store the various data structures used by a software application. The computer system 200 may also include read only memory (ROM) 206 which may be PROM, EPROM, EEPROM, optical storage, or the like. The ROM may store configuration information for booting the computer system 200. The RAM 208 and the ROM 206 hold user and system data, and both the RAM 208 and the ROM 206 may be randomly accessed.

The computer system 200 may also include an input/output (I/O) adapter 210, a communications adapter 214, a user interface adapter 216, and a display adapter 222. The I/O adapter 210 and/or the user interface adapter 216 may, in certain embodiments, enable a user to interact with the computer system 200. In a further embodiment, the display adapter 222 may display a graphical user interface (GUI) associated with a software or web-based application on a display device 224, such as a monitor or touch screen.

The I/O adapter 210 may couple one or more storage devices 212, such as one or more of a hard drive, a solid-state storage device, a flash drive, a compact disc (CD) drive, a floppy disk drive, and a tape drive, to the computer system 200. According to one embodiment, the data storage 212 may be a separate server coupled to the computer system 200 through a network connection to the I/O adapter 210. The communications adapter 214 may be adapted to couple the computer system 200 to the network 208, which may be one or more of a LAN, WAN, and/or the Internet. The communications adapter 214 may also be adapted to couple the computer system 200 to other networks such as a global positioning system (GPS) or a Bluetooth network. The user interface adapter 216 couples user input devices, such as a keyboard 220, a pointing device 218, and/or a touch screen (not shown) to the computer system 200. The keyboard 220 may be an on-screen keyboard displayed on a touch panel. Additional devices (not shown) such as a camera, microphone, video camera, accelerometer, compass, and or gyroscope may be coupled to the user interface adapter 216. The display adapter 222 may be driven by the CPU 202 to control the display on the display device 224. Any of the devices 202-222 may be physical and/or logical.

The applications of the present disclosure are not limited to the architecture of a computer system 200. Rather the computer system 200 is provided as an example of one type of computing device that may be adapted to perform the functions of a multi-point-of-view video chat system, including servers, personal computers, and mobile devices as shown in FIG. 3. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 200 may be virtualized for access by multiple users and/or applications.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

What is claimed is:

1. A system for providing a multi-point-of-view video chatting environment for a group of participants over a computer network, the computer network being configured to communicatively interconnect a network server and a plurality of client devices over the Internet, the client device comprises:
   a microphone;
   a video capture device having speakers;
   a display device;
   a memory having instructions stored thereon; and
   a processor configured to execute the instructions on the memory to cause the electronic client device to:
   receive other user location and field of view data for other users within the multi-point-of-view video chatting environment;
   determine a current location and field of view of a current user the client device within the multi-point-of-view video chatting environment;
   receive current user streaming video and audio data from the microphone and video capture device of a current user of the client device;
   transmit the current location and field of view of a current user and the streaming video and audio data from the current user to the network server;
   receive current location and field of view of each of other users and the streaming video and audio data from each of other user from the network server;
   generate a visual map of the multi-point-of-view video chatting environment containing an avatar and a puck for the current user and each of the other users, the puck associated with each user is rendered at a position within the visual map and an orientation associated with the field of view associated with the corresponding user;
   wherein the avatar for each of the users within the field of view of the current user corresponds to streaming video data received from each of the other users;
   wherein the puck comprises a rotation ring, the rotation ring comprising a rotation ring color;
   wherein the puck further comprises a rotation ring halo, the rotation ring halo comprising a rotation ring halo color,
   wherein the current user's rotation ring color matches the other users' rotation ring color to indicate that the current user is within the field of view of the other users with a matching rotation ring color as the current user;
   wherein the current user's streaming video data is displayed and streaming audio data is played to the other users with the matching rotation ring color as the current user;
   wherein the current user's rotation ring halo color matches the other users' rotation ring halo color to indicate that the other users are within the field of view of the current user with a matching rotation ring halo color as the other users;
   wherein the other users' streaming video data is displayed and streaming audio data is played to the current user with the matching rotation ring color as the other users;
   wherein the puck further comprises an orientation indicator;
   wherein the puck further comprises an earshot region surrounding the puck, wherein the earshot region limits playing audio data to the current user to audio data from other users existing within the earshot region;
   wherein the user's puck further comprises a plurality of leap marks extending from the current user's puck to the other user pucks;
   wherein the leap marks are configured to allow the current user to rotate to face one of the other users by selecting a leap mark extending from the current user's puck to the other user's puck;
   wherein the leap marks are configured to allow the current user to toggle through each leap mark to select a leap mark of a desired other user to face;
   generate a current user audio stream corresponding to a combination of all of the streaming audio data from the other users; and
   display the visual map to the current user and play the combination of all of the streaming audio data from the other users on the display device.

2. The system according to claim 1, wherein the avatar for each of the other users corresponds to an image of the corresponding user when streaming video data is not available.

3. The system according to claim 1, wherein the combination of all of the streaming audio data from the other users utilizes a distance of the current user location to each of the other users locations and an orientation of the field of view for each of the other users to the current user when combining the streaming audio data.

4. The system according to claim 3, wherein the distance of the current user to each of the other users includes volume of each of the respective streaming audio data based upon a relative difference and orientation in the distances of each of the other users to the current user.

5. The system according to claim 4, wherein the volume of each of the streaming audio data is reduced when an obstacle is between the current user and each of the other users providing a source of the respective streaming audio data when combined with each of the other users streaming audio data.

6. The system according to claim 1, wherein the client device receives a move input command to move the current location of the current user within the visual map of the multi-point-of-view video chatting environment.

7. The system according to claim 6, where the client device further receives a rotate input command to alter the field of view of the current user within the visual map of the multi-point-of-view video chatting environment.

8. A method for providing multi-point-of-view video chatting environment for a group of participants over a computer network, the computer network being configured to communicatively interconnect a network server and a plurality of client devices over the Internet, the client device having a microphone, a video capture device having speakers, a display device, a memory having instructions stored thereon, and a processor configured to execute the instructions on the memory to cause the electronic client device to implement the method, the method comprising:
   receiving other user location and field of view data for other users within the multi-point-of-view video chatting environment;

determining a current location and field of view of a current user the client device within the multi-point-of-view video chatting environment;

receiving current user streaming video and audio data from the microphone and video capture device of a current user of the client device;

transmitting the current location and field of view of a current user and the streaming video and audio data from the current user to the network server;

receiving current location and field of view of each of other users and the streaming video and audio data from each of other user from the network server;

generating a visual map of the multi-point-of-view video chatting environment containing an avatar and a puck for the current user and each of the other users, the puck associated with each user is rendered at a position within the visual map and an orientation associated with the field of view associated with the corresponding user;

wherein the avatar for each of the other users within the field of view of the current user corresponds to streaming video data received from each of the other users;

wherein the puck comprises a rotation ring, the rotation ring comprising a rotation ring color, wherein the puck further comprises a rotation ring halo, the rotation ring halo comprising a rotation ring halo color, wherein the current user's rotation ring color matches the other users' rotation ring color to indicate that the current user is within the field of view of other users with a matching rotation ring color as the current user;

wherein the current user's streaming video data is displayed and streaming audio data is played to the other users with the matching rotation ring color as the current user;

wherein the current user's rotation ring halo color matches the other users' rotation ring halo color to indicate that the other users are within the field of view of the current user with a matching rotation ring halo color as the other users;

wherein the other users' streaming video data is displayed and streaming audio data is played to the current user with the matching rotation ring color as the other users;

wherein the puck further comprises an orientation indicator;

wherein the puck further comprises an earshot region surrounding the puck, wherein the earshot region limits playing audio data to the current user to audio data from users existing within the earshot region;

wherein the user's puck further comprises a plurality of leap marks extending from the current user's puck to the other user pucks;

wherein the leap marks are configured to allow the current user to rotate to face one of the other users by selecting a leap mark extending from the current user's puck to the other user's puck;

wherein the leap marks are configured to allow the current user to toggle through each leap mark to select a leap mark of a desired other user to face;

generating a current user audio stream corresponding to a combination of all of the streaming audio data from the other users; and displaying the visual map to the current user and play the combination of all of the streaming audio data from the other users on the display device.

9. The method according to claim 8, wherein the avatar for each of the other users corresponds to an image of the corresponding user when streaming video data is not available.

10. The method according to claim 8, wherein the combination of all of the streaming audio data from the other users utilizes a distance of the current user location to each of the other users locations and an orientation of the field of view for each of the other users to the current user when combining the streaming audio data.

11. The method according to claim 10, wherein the distance of the current user to each of the other users includes volume of each of the respective streaming audio data based upon a relative difference in the distances of each of the other users to the current user.

12. The method according to claim 11, wherein the volume of each of the streaming audio data is reduced when an obstacle is between the current user and each of the other users providing a source of the respective streaming audio data when combined with each of the other users streaming audio data.

13. The method according to claim 8, wherein the client device receives a move input command to move the current location of the current user within the visual map of the multi-point-of-view video chatting environment.

14. The method according to claim 13, where the client device further receives a rotate input command to alter the field of view of the current user within the visual map of the multi-point-of-view video chatting environment.

15. A non-transitory computer-readable recording medium for providing multi-point-of-view video chatting environment for a group of participants over a computer network, the computer network being configured to communicatively interconnect a network server and a plurality of client devices over the Internet, the non-transitory computer-readable recording medium storing one or more programs which when executed by a client device performs steps comprising:

receiving other user location and field of view data for other users within the multi-point-of-view video chatting environment;

determining a current location and field of view of a current user the client device within the multi-point-of-view video chatting environment;

receiving current user streaming video and audio data from the microphone and video capture device of a current user of the client device;

transmitting the current location and field of view of a current user and the streaming video and audio data from the current user to the network server;

receiving current location and field of view of each of other users and the streaming video and audio data from each of other user from the network server;

generating a visual map of the multi-point-of-view video chatting environment containing an avatar and a puck for the current user and each of the other users, the puck associated with each user is rendered at a position within the visual map and an orientation associated with the field of view associated with the corresponding user;

wherein the avatar for each of the other users within the field of view of the current user corresponds to streaming video data received from each of the other users;

wherein the puck comprises a rotation ring, the rotation ring comprising a rotation ring color;

wherein the puck further comprises a rotation ring halo, the rotation ring halo comprising a rotation ring halo color;

wherein the current user's rotation ring color matches the other users' rotation ring color to indicate that the current user is within the field of view of other users with a matching rotation ring color as the current user;

wherein the current user's streaming video data is displayed and streaming audio data is played to the other users with the matching rotation ring color as the current user;

wherein the current user's rotation ring halo color matches the other users' rotation ring halo color to indicate that the other users are within the field of view of the current user with a matching rotation ring halo color as the other users;

wherein the other users' streaming video data is displayed and streaming audio data is played to the current user with the matching rotation ring color as the other users;

wherein the puck further comprises an orientation indicator;

wherein the puck further comprises an earshot region surrounding the puck, wherein the earshot region limits playing audio data to the current user to audio data from users existing within the earshot region;

wherein the user's puck further comprises a plurality of leap marks extending from the current user's puck to the other user pucks;

wherein the leap marks are configured to allow the current user to rotate to face one of the other users by selecting a leap mark extending from the current user's puck to the other user's puck, generating a current user audio stream corresponding to a combination of all of the streaming audio data from the other users; and displaying the visual map to the current user and play the combination of all of the streaming audio data from the other users on the display device.

16. The non-transitory computer-readable recording medium according to claim 14, wherein the combination of all of the streaming audio data from the other users utilizes a distance of the current user location to each of the other users locations and an orientation of the field of view for each of the other users to the current user when combining the streaming audio data, the distance of the current user to each of the other users includes volume of each of the respective streaming audio data based upon a relative difference in the distances of each of the other users to the current user.

17. The non-transitory computer-readable recording medium according to claim 16, wherein the volume of each of the streaming audio data is reduced when an obstacle is between the current user and each of the other users providing a source of the respective streaming audio data when combined with each of the other users streaming audio data.

18. The non-transitory computer-readable recording medium according to claim 17, the client device receives a move input command to move the current location of the current user within the visual map of the multi-point-of-view video chatting environment and receives a rotate input command to alter the field of view of the current user within the visual map of the multi-point-of-view video chatting environment.

* * * * *